(12) United States Patent
Takeuchi

(10) Patent No.: US 12,086,623 B2
(45) Date of Patent: Sep. 10, 2024

(54) SYSTEM, METHOD, AND PROGRAM

(71) Applicant: NIPPON TELEGRAPH AND TELEPHONE CORPORATION, Tokyo (JP)

(72) Inventor: Kaku Takeuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 417 days.

(21) Appl. No.: 17/593,064

(22) PCT Filed: Feb. 27, 2020

(86) PCT No.: PCT/JP2020/008097
§ 371 (c)(1),
(2) Date: Sep. 8, 2021

(87) PCT Pub. No.: WO2020/184202
PCT Pub. Date: Sep. 17, 2020

(65) Prior Publication Data
US 2022/0188142 A1    Jun. 16, 2022

(30) Foreign Application Priority Data
Mar. 11, 2019 (JP) .................. 2019-043983

(51) Int. Cl.
*G06F 3/00* (2006.01)
*G06F 9/455* (2018.01)

(52) U.S. Cl.
CPC ............ *G06F 9/45558* (2013.01); *G06F 2009/45595* (2013.01)

(58) Field of Classification Search
CPC ...................................................... G06F 9/455
See application file for complete search history.

(56) References Cited

U.S. PATENT DOCUMENTS

| | | | | |
|---|---|---|---|---|
| 6,970,902 B1* | 11/2005 | Moon | .................. | H04L 67/51 |
| | | | | 709/201 |
| 8,423,632 B2* | 4/2013 | Yin | .................. | H04L 41/0893 |
| | | | | 709/228 |
| 8,429,675 B1* | 4/2013 | Radhakrishnan | ..... | G06F 9/5077 |
| | | | | 719/319 |
| 8,997,094 B2* | 3/2015 | Bosch | .................. | G06F 9/4856 |
| | | | | 718/1 |

(Continued)

OTHER PUBLICATIONS

Paul Willmann, Concurrent Direct Network Access for Virtual Machine Monitors. (Year: 2007).*

(Continued)

*Primary Examiner* — Lechi Truong
(74) *Attorney, Agent, or Firm* — XSENSUS LLP

(57) ABSTRACT

A system, a method, and a program for automatically creating a command that is used to establish a network in a virtual machine environment is provided. The system includes a network establishing terminal that includes a command creation function and at least one server device that provides a virtual machine environment in which a virtual machine operates, wherein the network establishing terminal automatically creates at least one command that is used to establish a network in the virtual machine environment based on network design information and information regarding the virtual machine environment.

20 Claims, 10 Drawing Sheets

(56) References Cited

U.S. PATENT DOCUMENTS

| | | | |
|---|---|---|---|
| 9,043,786 B1 * | 5/2015 | Hodge | G06F 9/5077 |
| | | | 718/1 |
| 9,356,866 B1 * | 5/2016 | Sivaramakrishnan | H04L 45/50 |
| 9,772,866 B1 * | 9/2017 | Aron | G06F 9/45558 |
| 9,813,485 B2 * | 11/2017 | Blackburn | H04L 67/10 |
| 10,320,644 B1 * | 6/2019 | Chen | H04L 41/147 |
| 11,360,799 B2 * | 6/2022 | Liu | G06F 9/45558 |
| 11,765,174 B2 * | 9/2023 | Chanda | H04L 63/0815 |
| | | | 726/1 |
| 2007/0294676 A1 * | 12/2007 | Mellor | G06F 9/45533 |
| | | | 717/139 |
| 2009/0288084 A1 * | 11/2009 | Astete | G06Q 30/02 |
| | | | 718/1 |
| 2014/0032897 A1 * | 1/2014 | Datta | H04L 63/0823 |
| | | | 713/151 |
| 2015/0095443 A1 * | 4/2015 | Yang | G06F 9/45558 |
| | | | 709/212 |
| 2015/0172760 A1 * | 6/2015 | AbiEzzi | A63F 13/32 |
| | | | 725/39 |
| 2015/0281067 A1 * | 10/2015 | Wu | H04L 45/586 |
| | | | 370/392 |
| 2016/0057207 A1 * | 2/2016 | Li | H04L 67/10 |
| | | | 709/203 |
| 2017/0005923 A1 * | 1/2017 | Babakian | G06F 9/45558 |

OTHER PUBLICATIONS

René Müller, A Virtual Machine For Sensor Networks . (Year: 2007).*

Yoshiteru Kageyama et al., Computer virtualization technology, IEEJ Journal, 2013, pp. 692-695, vol. 133, No. 10.

* cited by examiner

FIG. 7

VM LIST
(FROM VIRTUAL MACHINE ENVIRONMENT INFORMATION)

| NODE ID | OS TYPE | VERSION |
|---------|---------|---------|
| N0 | CentOS | 6 |
| N1 | CentOS | 7 |
| N2 | CentOS | 5 |
| N3 | Cisco IOS | 12.4 |
| N4 | RedHat | 7 |
| N5 | CentOS | 7 |
| N6 | RedHat | 7 |
| ⋮ | ⋮ | ⋮ |

OS OF N0 IS CentOS6

FIG. 8

| VIRTUAL SWITCH ID | NW INTERFACE CORRESPONDENCE TABLE (FROM VIRTUAL MACHINE ENVIRONMENT INFORMATION) | | | | | | |
|---|---|---|---|---|---|---|---|
| | NODE ID | | | | | | |
| | N0 | N1 | N2 | N3 | N4 | N5 | N6 |
| SW0 | eth0 | lan0 | eth0 | ge0/0 | eth0 | eth0 | eth0 |
| SW1 | eth1 | lan1 | eth1 | ge0/1 | eth1 | eth1 | eth1 |
| SW2 | eth2 | lan2 | eth2 | ge0/2 | eth2 | eth2 | eth2 |
| ... | ... | ... | ... | ... | ... | ... | ... |

| VIRTUAL SWITCH ID | ADDRESS TABLE (FROM NW DESIGN INFORMATION) | | | | | | |
|---|---|---|---|---|---|---|---|
| | NODE ID | | | | | | |
| | N0 | N1 | N2 | N3 | N4 | N5 | N6 |
| SW0 | ⟨IPv4, 192.168.10.10, 255.255.255.0⟩ | ⟨IPv4, 192.168.10.11, 255.255.255.0⟩ | ⟨IPv4, 192.168.10.12, 255.255.255.0⟩ | ... | ... | ... | ... |
| SW1 | | ⟨IPv4, 192.168.20.21, 255.255.255.0⟩ | ⟨IPv4, 192.168.20.22, 255.255.255.0⟩ | ... | ... | ... | ... |
| SW2 | | | | ... | ... | ... | ... |
| ... | | | | | | | |

ADDRESS INFORMATION ETC. TO BE SET:
NW INTERFACE = eth0
IPv4 ADDRESS = 192.168.10.10
NET MASK = 255.255.255.0

FIG. 9

COMMAND TEMPLATE TABLE (FROM VIRTUAL MACHINE ENVIRONMENT INFORMATION)

| OPERATION | OS TYPE | VERSION | COMMAND |
|---|---|---|---|
| SETTING OF IPv4 ADDRESS | CentOS | 6 | ifconfig<NW INTERFACE><IPv4 ADDRESS><IPv4 NET MASK> |
| | CentOS | 7 | nmcli connection modify <NW INTERFACE>ipv4.method manual ipv4.addresses<IPv4 ADDRESS>/<IPv4 NET MASK> |
| | ... | ... | ... |
| SETTING OF IPv4 DEFAULT GATEWAY | CentOS | 6 | route add default gw <IPv4 DEFAULT GATEWAY> |
| | CentOS | 7 | nmcli connection modify <NW INTERFACE>ipv4.gateway<IPv4 DEFAULT GATEWAY> |
| | ... | ... | ... |
| ... | | | |

SELECT TEMPLATE FOR CentOS6 AND APPLY ADDRESS INFORMATION ETC.

ADDRESS SETTING COMMAND FOR N0:
ifconfig eth0 192.168.10.10 255.255.255.0

SYSTEM, METHOD, AND PROGRAM

TECHNICAL FIELD

The present invention relates to a system, a method, and a program, and particularly to a system, a method, and a program that assist establishment of a network in a virtual machine environment.

BACKGROUND ART

In recent years, server environments that are necessary for various verification operations are established using technologies for virtualizing servers and networks (NWs). In such a case, an OS (Operating System) called a "hypervisor" is used, which enables simulative implementation of an environment with the technologies for virtualizing servers and networks without the need for preparing a group of physical devices such as a group of server devices or a group of network devices. A group of devices that includes the hypervisor OS described above and implements virtual server devices and virtual network devices is called a "virtual machine environment".

Use of the virtual machine environment has economic merits such as a reduction in the number of physical devices, a reduction in purchase cost of the physical devices, and a reduction in installation space for the physical devices. Furthermore, there is a merit in that if a virtual machine (VM) of a required server has been created in a virtual machine environment, the virtual machine can be reused to reduce the labor of creating the virtual machine again.

CITATION LIST

Non Patent Literature

[NPL 1] KageyamaYoshiteru, KawagomeKazuhiro, Harashima Shuji, "Virtualization Technology Relevant to Computers", IEEJ Journal, Vol. 133, No. 10, (2013), pp. 692-695

SUMMARY OF THE INVENTION

Technical Problem

If physical devices are replaced with virtual devices in establishment of a network that is constituted by a plurality of server devices and network devices, convenience is enhanced, but in such a case as well, establishment of the network involves troublesome work relating to address settings and service settings of servers, wiring between the servers, etc.

Also, a network (NW) designer needs to prepare a list of commands that are necessary to establish the network, giving consideration to the configuration of a virtual machine environment that is to be used, such as the type of OS that can be used in the virtual machine environment. That is, there is an issue in that knowledge of the virtual machine environment and a high skill of command operation are required for the NW designer.

Also, if an operator who establishes the network is inexperienced in command operation of an OS that runs in a server VM, operation mistakes such as setting omission or setting error may occur.

Therefore, the present invention made in view of the problems described above has an object of providing a system, a method, and a program that make it possible to automatically create a command that is used to establish a network constituted by a plurality of server devices and network devices in a virtual machine environment and to easily establish the network in the virtual machine environment.

Means for Solving the Problem

To solve the problems described above, a system according to the present invention includes: a network establishing terminal that includes a command creation function; and at least one server device that provides a virtual machine environment in which a virtual machine operates, wherein the network establishing terminal automatically creates at least one command that is used to establish a network in the virtual machine environment based on network design information and information regarding the virtual machine environment.

In a preferable configuration of the system, the network design information includes at least information regarding an address, information regarding routing, information regarding a service, information regarding access control, and meta information regarding a virtual machine, as information regarding each node that constitutes the network.

In a preferable configuration of the system, the information regarding the virtual machine environment includes at least a list of virtual machines that are pooled in the virtual machine environment, information regarding network interfaces of the virtual machines, and templates of commands corresponding to operating systems of the virtual machines.

In a preferable configuration of the system, the at least one command is a command list that is prepared for each virtual machine that is pooled in the virtual machine environment, and the command list includes at least a command regarding address setting, a command regarding routing setting, a command regarding service setting, and a command regarding access control.

To solve the problems described above, a method according to the present invention includes: automatically creating at least one command that is used to establish a network in a virtual machine environment, based on network design information and information regarding the virtual machine environment; and executing the at least one command to establish the network in the virtual machine environment.

In a preferable configuration of the method, the at least one command is a command list that is prepared for each virtual machine that is pooled in the virtual machine environment, and the command list includes at least a command regarding address setting, a command regarding routing setting, a command regarding service setting, and a command regarding access control.

To solve the problems described above, a program according to the present invention causes a computer to execute: a step of acquiring network design information and information regarding a virtual machine environment; a step of creating at least one command that is used to establish a network in the virtual machine environment, based on the network design information and the information regarding the virtual machine environment; and a step of outputting the at least one command.

In a preferable configuration of the program, the step of creating at least one command includes reading at least an OS of a virtual machine that is pooled in the virtual machine environment and a template of a command corresponding to the OS of the virtual machine from the information regarding the virtual machine environment, reading at least information that is to be set in a node of the network from the network design information, and applying the information that is to be set in the node to a parameter in the template of the command.

Effects of the Invention

With the system, the method, and the program according to the present invention, it is possible to automatically create a command that is used to establish a network constituted by a plurality of server devices and network devices in a virtual machine environment and to easily establish the network in the virtual machine environment.

BRIEF DESCRIPTION OF DRAWINGS

FIG. 7 is a diagram showing a procedure (step 1) for creating a command for performing network setting.

FIG. 8 is a diagram showing the procedure (step 2) for creating a command for performing network setting.

FIG. 9 is a diagram showing the procedure (step 3) for creating a command for performing network setting.

DESCRIPTION OF EMBODIMENTS

The following describes an embodiment of the present invention using the drawings. Note that a network that is established in a virtual machine environment and is constituted by a plurality of server devices and network devices may be referred to as a "pseudo NW" in the present specification.

Embodiment

Figure 1:
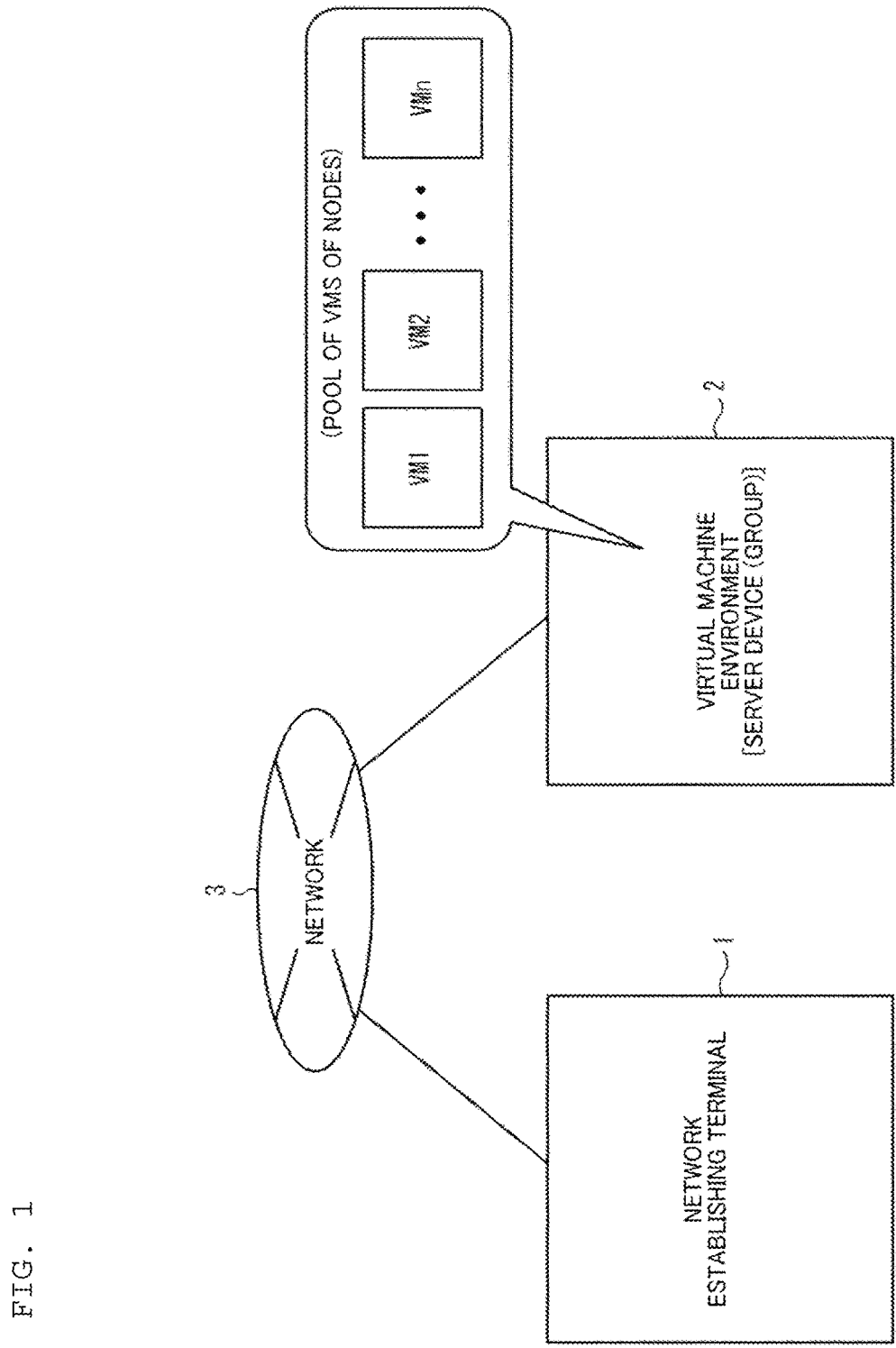
FIG. 1 is a diagram showing an example of the entire configuration of a system according to the present invention.

FIG. 1 shows an example of the entire configuration of a system according to the present invention. The system according to the present invention is constituted by a network establishing terminal 1 and a virtual machine environment 2, and preferably further includes a network 3 for mutual communication between the network establishing terminal 1 and the virtual machine environment 2.

The network establishing terminal 1 is a terminal device that includes a "command creation function", which will be described later, and automatically creates at least one command that is used to establish a network in the virtual machine environment, based on network design information and information regarding the virtual machine environment.

The virtual machine environment 2 is an environment in which virtual machines operate, includes resources such as a memory (main storage device) having a capacity appropriate for making the plurality of virtual machines operate, an auxiliary storage device constituted by a HDD (Hard Disk Drive) or the like, and a CPU (Central Processing Unit), and is implemented by a server device (or a group of server devices) in which a hypervisor OS is installed. Virtual machines (VM1, VM2, . . . , VMn) that serve nodes in the network are pooled in the virtual machine environment 2. Note that KVM, VMware vSphere, MS Hyper-V, or the like can be used as the hypervisor OS.

The network 3 is a communication environment that connects the network establishing terminal 1 and the virtual machine environment 2 to each other, is not limited to specific hardware, and can be implemented using a suitable communication means. The network establishing terminal 1, the virtual machine environment 2, and a group of virtual machines (VMs) that operate in the virtual machine environment 2 can communicate with each other via the network 3.

Figure 2:
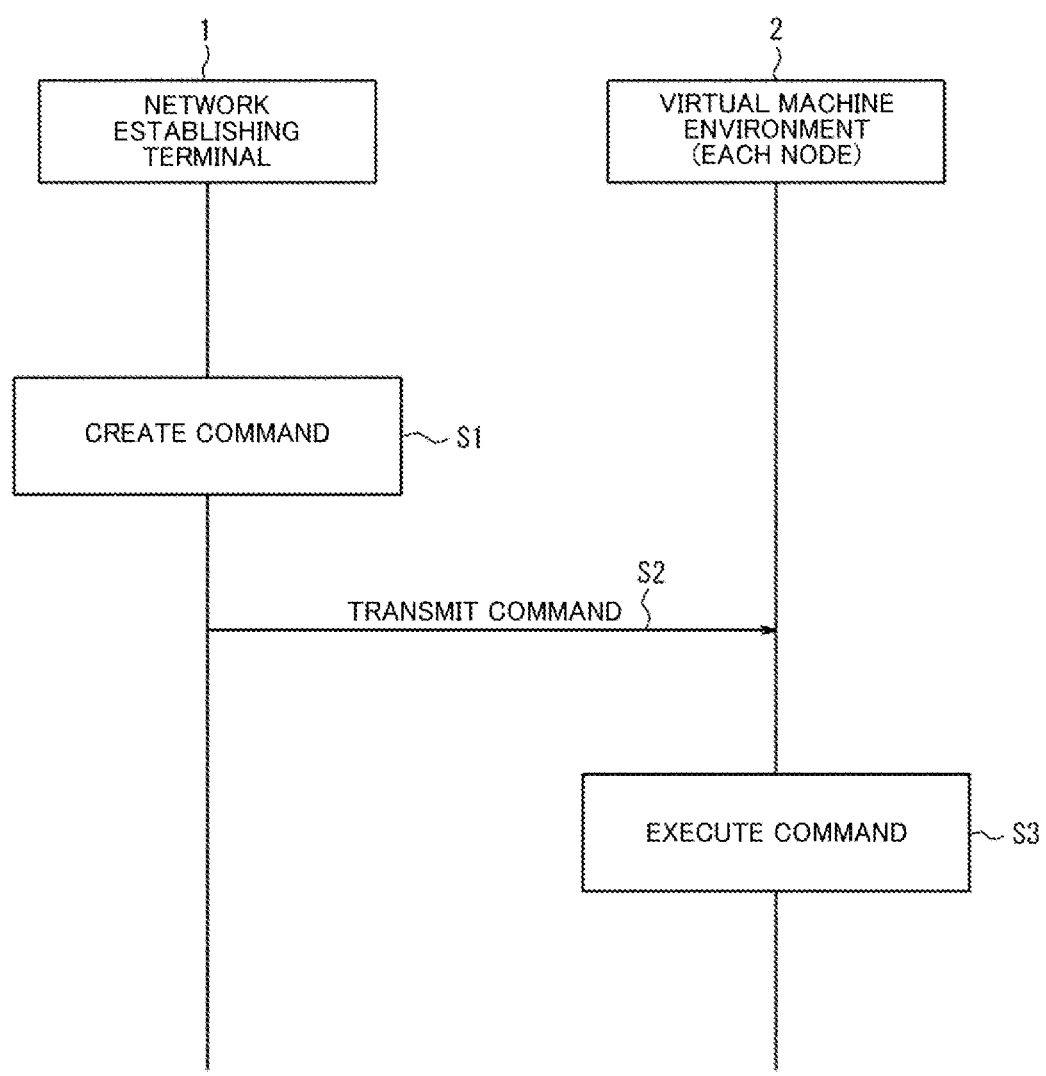
FIG. 2 is a diagram showing an example of a message sequence chart of the system according to the present invention.

FIG. 2 is an example of a message sequence chart of the system according to the present invention. The entire flow of establishment of a network in a virtual machine environment using the system according to the present invention will be described using the message sequence chart shown in FIG. 2.

Step 1 (S1): Command Creation

First, the network establishing terminal 1 creates commands (command list) for each node that operates in the virtual machine environment 2, using the command creation function. The command list is created based on "virtual machine environment information" (information regarding the virtual machine environment) and "network design information" that have been input, as described later.

Step 2 (S2): Command Transmission

The network establishing terminal 1 transmits the created commands (command list) to each node in the virtual machine environment 2. Note that serial connection of a console or the like or a known means such as Telent/SSH can be used as a transmission means.

Step 3 (S3): Command Execution

The command list received from the network establishing terminal 1 is executed by each node (VM) in the virtual machine environment 2. Thus, a required pseudo NW is established in the virtual machine environment 2.

Note that steps S1 to S3 may also be executed as a series of operations to automatically execute a procedure from input of the "virtual machine environment information" and the "network design information" to establishment of a network in the virtual machine environment 2.

Figure 3:
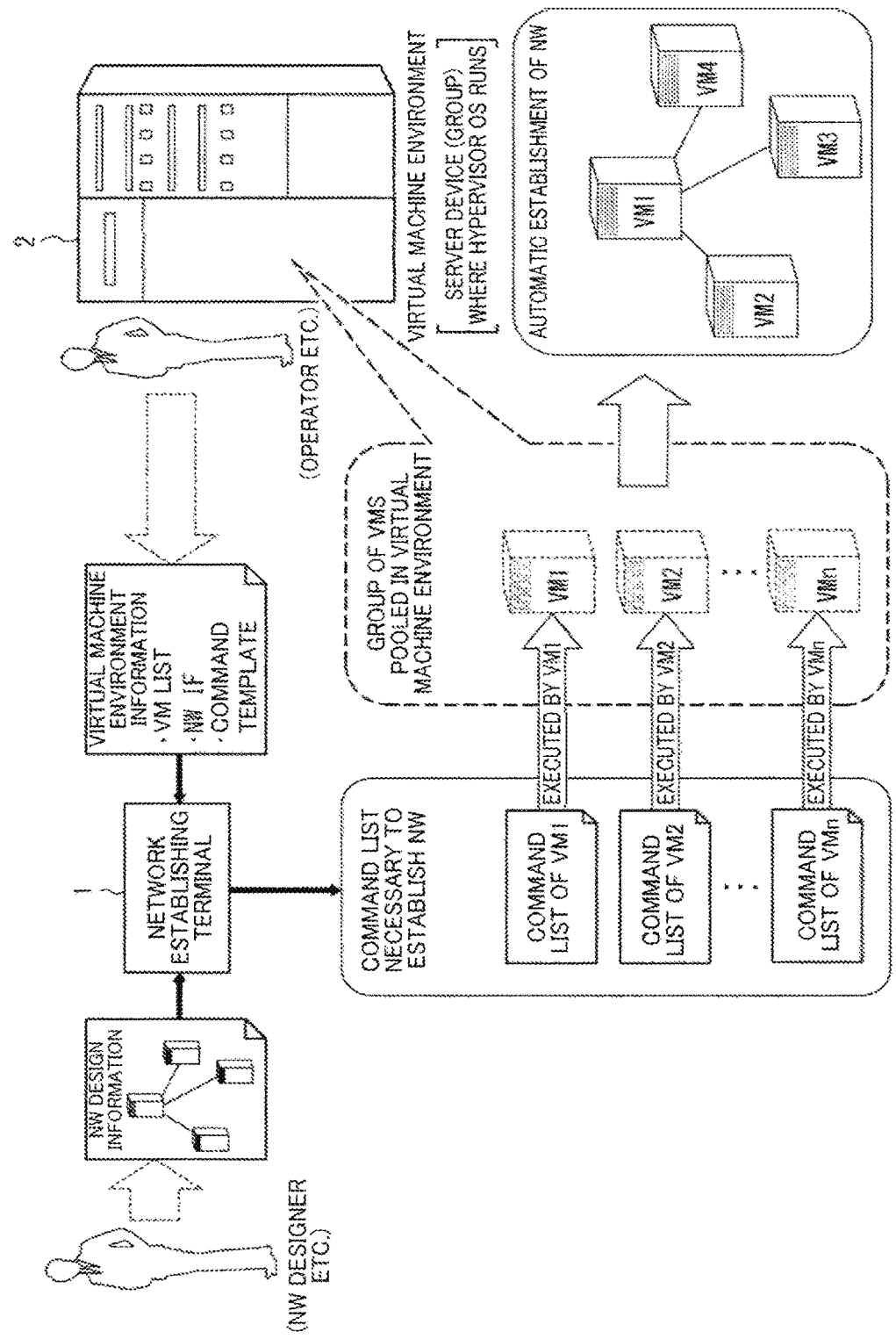
FIG. 3 is a diagram schematically showing use of the present invention.

FIG. 3 is a diagram schematically showing use of the present invention. Command lists that are used to establish a network are automatically created by the network establishing terminal 1 based on the "network (NW) design information" regarding the network to be established and the "virtual machine environment information", and the command lists are executed in the virtual machine environment 2 to establish the required network.

First, the "virtual machine environment information" (information regarding the virtual machine environment) is provided from the virtual machine environment 2 to the network establishing terminal 1. The "virtual machine environment information" is information that is dependent on each virtual machine environment 2, and is usually created by an operator or the like of the virtual machine environment 2 (=server device (group) in which the hypervisor OS runs). The information regarding the virtual machine environment includes a VM list, a NW interface correspondence table, and a command template table, for example.

Also, a network designer or the like creates the "network design information". The "network design information" is information that is dependent on the network (NW) that is to be established, and can be created independently from the virtual machine environment. The network design information includes an address table, a routing table, a service table, an access control table, and a meta information table, for example.

The network establishing terminal 1 includes the command creation function. That is, the network establishing terminal 1 automatically creates command lists that are necessary to establish a network, based on the "virtual machine environment information" and the "network design information" that have been input, and outputs the command lists. The command lists are respectively created for virtual machines (VM1, VM2, . . . , VMn) in the virtual machine environment 2. For example, commands for performing IP address setting, routing setting, service setting, and access control setting are created as commands that are necessary to establish a network.

The command lists created by the network establishing terminal 1 are respectively executed by corresponding virtual machines (VM1, VM2, . . . , VMn) in the virtual machine environment. Through execution of the commands, each VM of the group of VMs pooled in the virtual machine environment functions as a node in the network to be established. Thus, the network is automatically established in the virtual machine environment 2.

As described above, according to the present invention, commands used to establish a network in a virtual machine environment can be automatically created, the network constituted by a plurality of server devices and network devices can be easily established in the virtual machine environment, and a cost required for the establishment of the network can be reduced. Furthermore, the network can be automatically established in the virtual machine environment.

Furthermore, according to the present invention, even if configurations of virtual machine environments differ from each other, a similar network can be established if "virtual machine environment information" corresponding to each configuration can be prepared.

Figure 4:
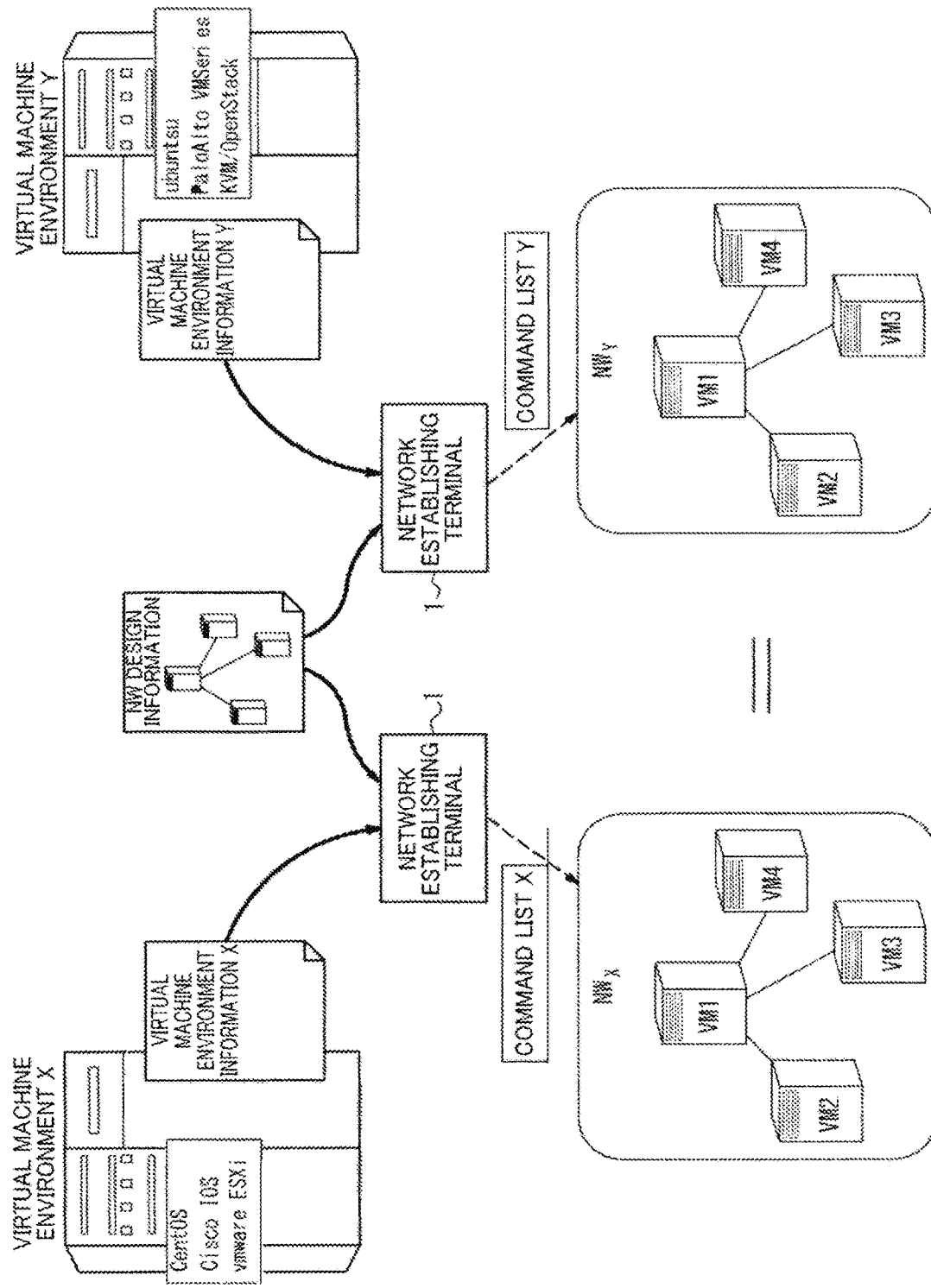
FIG. 4 is a diagram showing an example in which networks are established in different virtual machine environments.

FIG. 4 is a diagram showing an example in which networks are established in different virtual machine environments.

First, a case where a network is established in a virtual machine environment X will be described. Assume that the virtual machine environment X is designed based on an OS such as CentOS, Cisco IOS, or VMware ESXi, for example. "Virtual machine environment information X" corresponding to the virtual machine environment X is acquired from an operator of the virtual machine environment, and is used as an input to the network establishing terminal 1. On the other hand, the "network design information" is created by a network designer as described with reference to FIG. 3, and is used as another input to the network establishing terminal 1.

The network establishing terminal 1 automatically creates a "command list X" that is necessary to establish a network, based on the input "virtual machine environment information X" and "network design information" by using the command creation function. As a result of the command list X being executed by each VM in the virtual machine environment X, a network NWx can be established.

Next, a case where a network is established in a virtual machine environment Y will be described. Assume that the virtual machine environment Y is designed based on an OS such as ubuntsu, Palo Alto VMSeries, or KVM/OpenStack, for example. "Virtual machine environment information Y" corresponding to the virtual machine environment Y is acquired from an operator of the virtual machine environment, and is used as an input to the network establishing terminal 1. On the other hand, the network designer uses the same "network design information" as that created for the virtual machine environment X, as another input to the network establishing terminal 1.

The network establishing terminal 1 automatically creates a "command list Y" that is necessary to establish a network, based on the input "virtual machine environment information Y" and "network design information" by using the command creation function. As a result of the command list Y being executed by each VM in the virtual machine environment Y, a network NWy that has a configuration equivalent to that of the network NWx can be established.

That is, according to the present invention, networks that are each constituted by a plurality of server devices and network devices and are equivalent to each other can be automatically established in different virtual machine environments. Also, work corresponding to each virtual machine environment can be eliminated to reduce a cost required for the establishment of the networks.

The network designer can concentrate on topological design of a network that is to be established, and can establish the required network without giving consideration to the configuration of a virtual machine environment.

Also, since the network is automatically established, it is possible to avoid operation mistakes that may be caused if the OS of each VM is operated by an operator.

Next, "virtual machine environment information" and "network design information" that are used to create commands will be described.

(1) Virtual Machine Environment Information

First, "virtual machine environment information" used in the present invention will be described. The "virtual machine environment information" is information regarding a virtual machine environment in which a network is to be established, and is information that is dependent on the virtual machine environment (which may also be referred to as "information regarding the virtual machine environment"). Usually, the "virtual machine environment information" is provided from an operator or the like of the virtual machine environment. The "virtual machine environment information" includes the following three constitutional elements.

(1-1) VM list: a list of node IDs that are assigned to VMs in the virtual machine environment and types and versions of OS installed in the VMs (1-2) NW interface correspondence table: a correspondence table of virtual switches via which "NW interfaces" of nodes are wired (1-3) Command template table: a list of templates for creating "commands" that cause the OS of a VM of each node to perform operations for establishing a pseudo NW Note that these constitutional elements are expressed using any of XML (eXtensible Markup Language), JSON (JavaScript (registered trademark) Object Notation), and CSV (Comma Separated Values), which are widely used in information processing performed using a computer, or a file format (data format) corresponding to commercially available spreadsheet software or the like, and are implemented as electronic files.

Also, in the following description, these constitutional elements are described as being separate from each other for the sake of convenience of description, but in a practical application, these constitutional elements may also be implemented as a single file into which the constitutional elements are combined. The following describes the constitutional elements.

(1-1) VM List

The "VM list" is a list for identifying a correspondence between a node ID that is assigned to a virtual machine (VM) pooled in the virtual machine environment and the type and version of an OS that is installed in the VM.

Table 1 shows an example data structure of the VM list. The VM list is a table that collectively shows a node ID (N0, N1, . . . ), an OS type (CentOS, Cisco IOS, etc., note that distributions of each OS are also taken into consideration), and a version of OS of each virtual machine (VM). Based on the VM list, it is possible to find the OS of a virtual machine based on the node ID of the virtual machine.

TABLE 1

| Node ID | OS type | Version |
|---|---|---|
| N0 | CentOS | 6 |
| N1 | CentOS | 7 |
| N2 | CentOS | 5 |
| N3 | Cisco IOS | 12.4 |
| N4 | RedHat | 7 |
| N5 | CentOS | 7 |
| N6 | RedHat | 7 |
| . . . | | |

(1-2) NW Interface Correspondence Table

The "NW interface correspondence table" is a table for identifying a correspondence between a "network (NW) interface" of a virtual machine (VM) and a virtual switch (SW) that is used for connecting/wiring the interface in the virtual machine environment to be used. Note that there are the following preconditions for use of the "NW interface correspondence table".

(i) Each virtual machine (VM) is connected to all virtual switches (SWs).

(ii) In initial settings of the OS of each virtual machine (VM), all NW interfaces included in the VM are disabled and communication cannot be performed in the initial state.

Figure 5:
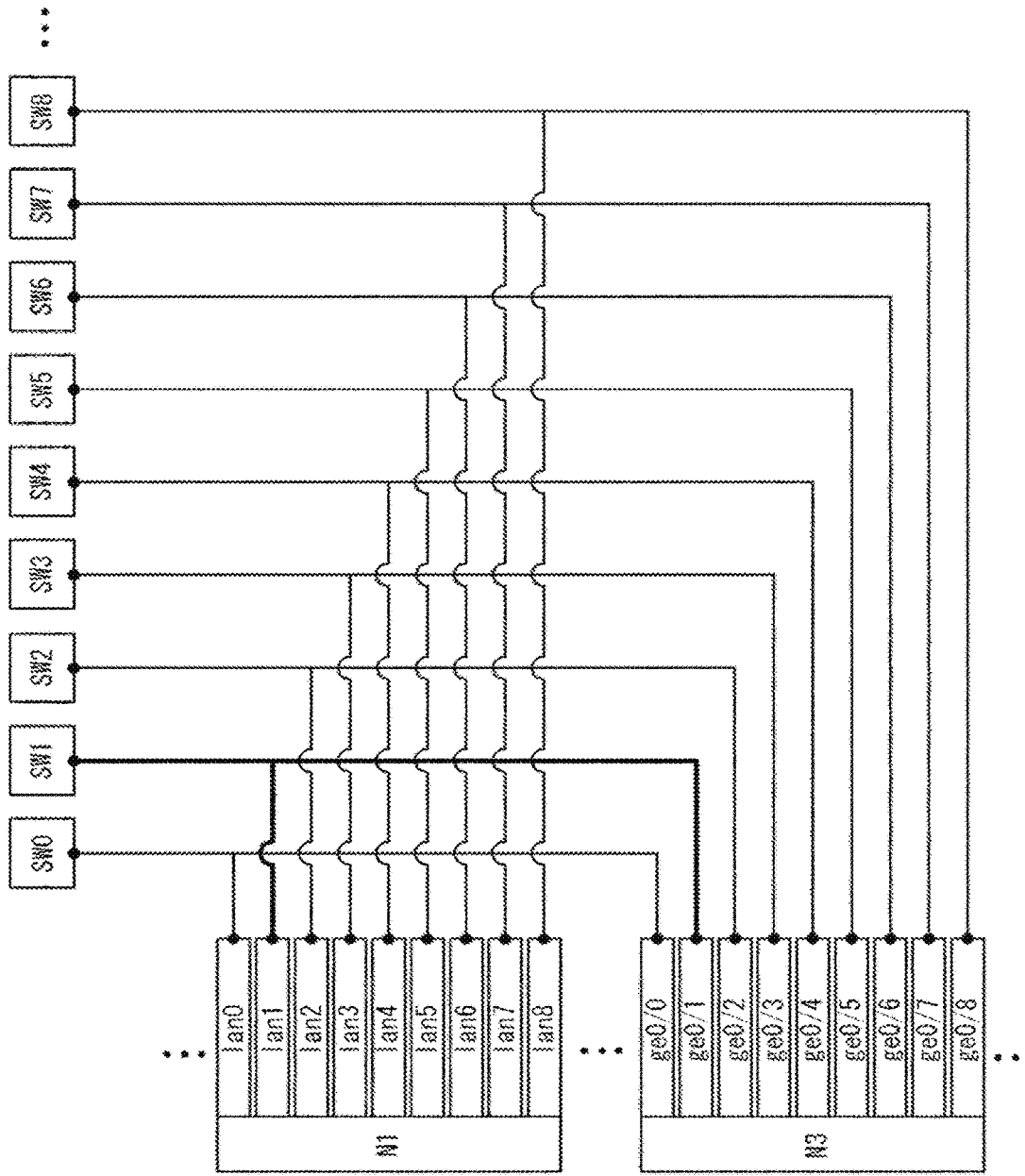
FIG. 5 is a diagram schematically showing wiring between virtual machines (VMs).

Table 2 shows an example data structure of the NW interface correspondence table. The NW interface correspondence table collectively shows NW interfaces of each virtual machine (VM) that are used for respective virtual switches. In the example shown in Table 2, a virtual machine (node ID:N0) is connected to a virtual switch SW0 via a NW interface eth0, is connected to SW1 via eth1, is connected to SW2 via eth2, and so on. The connection relationship between NW interfaces of virtual machines (VMs) and virtual switches SWs, i.e., wiring between the virtual machines (VMs) is schematically shown in FIG. 5.

By using the NW interface correspondence table (=schematic illustration of the wiring shown in FIG. 5), it can be found that a virtual machine (node ID:N1) and a virtual machine (node ID:N3) can be connected to each other via a virtual switch SW1 by enabling a NW interface lan1 of N1 and a NW interface ge0/1 of N3.

A desired network design (network configuration) can be reflected in the virtual machine environment by connecting the virtual machines (VMs) and the virtual switches (SWs) to each other in advance and enabling required interfaces as described above.

TABLE 2

| | | Node ID | | | | | | |
|---|---|---|---|---|---|---|---|---|
| | | N0 | N1 | N2 | N3 | N4 | N5 | N6 | . . . |
| Virtual switch ID | SW0 | eth0 | lan0 | eth0 | ge0/0 | eth0 | eth0 | eth0 | . . . |
| | SW1 | eth1 | lan1 | eth1 | ge0/1 | eth1 | eth1 | eth1 | . . . |
| | SW2 | eth2 | lan2 | eth2 | ge0/2 | eth2 | eth2 | eth2 | . . . |
| | . . . | . . . | . . . | . . . | . . . | . . . | . . . | . . . | . . . |

(1-3) Command Template Table

The "command template table" is a list (table) of templates for creating "commands" that cause the OS of each virtual machine (VM) pooled in the virtual machine environment to perform operations for establishing a network.

Table 3 shows an example data structure of the command template table. Specifically, the command template table is a table that collectively shows commands that are to be executed and items that serve as parameters of the commands, for each operation for establishing a network (pseudo NW), each OS type (differences between distributions of the OS are also taken into consideration), and each version of the OS. Based on the command template table, it is possible to obtain a template of a command based on an operation that is to be executed and the OS type and the like of a target VM.

TABLE 3

| Operation | OS type | Version | Command |
|---|---|---|---|
| Setting of IPv4 address | CentOS | 6 | Ifconfig <NW interface> <IPv4 address> <IPv4 netmask> |
| | CentOS | 7 | nmcli connection modify <NW interface> ipv4.method manual ipv4.addresses <IPv4 address>/<IPv4 netmask> |
| | . . . | . . . | . . . |
| Setting of IPv4 default gateway | CentOS | 6 | route add default gw <IPv4 default gateway> |
| | CentOS | 7 | nmcli connection modify <NW interface> ipv4.gateway <IPv4 default gateway> |
| | . . . | . . . | . . . |
| Setting of IPv4 static route | CentOS | 6 | route add -net <connection destination address> gw <gateway address> netmask <connection destination netmask> <NW interface> |
| | CentOS | 7 | nmcil connection modify <NW interface> + ipv4.routes' <connection destination address>/<connection destination netmask> <gateway address>' |
| | . . . | . . . | . . . |
| . . . | . . . | . . . | . . . |

(2) Network (NW) Design Information

Next, "network (NW) design information" used in the present invention will be described. The "network (NW) design information" is information regarding the configuration of a network that is to be established, and is created by a network designer or the like. The "network (NW) design information" does not include information that is dependent on the virtual machine environment. The "network (NW) design information" includes the following five constitutional elements.

(2-1) Address table: a table that collectively shows information regarding IP addresses that are used by NW interfaces of nodes (2-2) Routing table: a table that collectively shows information regarding routing that is used by nodes (2-3) Service table: a table that collectively shows information such as listen port numbers of services running in nodes (2-4) Access control table: a table that collectively shows information regarding access control performed at nodes that serve as routers or firewalls (2-5) Meta information table: a table that collectively shows various types of meta information regarding nodes (e.g., information regarding the use of each node)

Note that these constitutional elements are expressed using any of XML (eXtensible Markup Language), JSON (JavaScript (registered trademark) Object Notation), and CSV (Comma Separated Values), which are widely used in information processing performed using a computer, or a file format (data format) corresponding to commercially available spreadsheet software or the like, and are implemented as electronic files.

Also, in the following description, these constitutional elements are described as being separate from each other for the sake of convenience of description, but in a practical application, a plurality of constitutional elements may also be implemented as a file format (single file) into which the constitutional elements are combined. For example, the address table and the routing table both relate to network setting and therefore data formats of these tables may be combined. However, each element needs to be extracted from a combined file.

Figure 6:
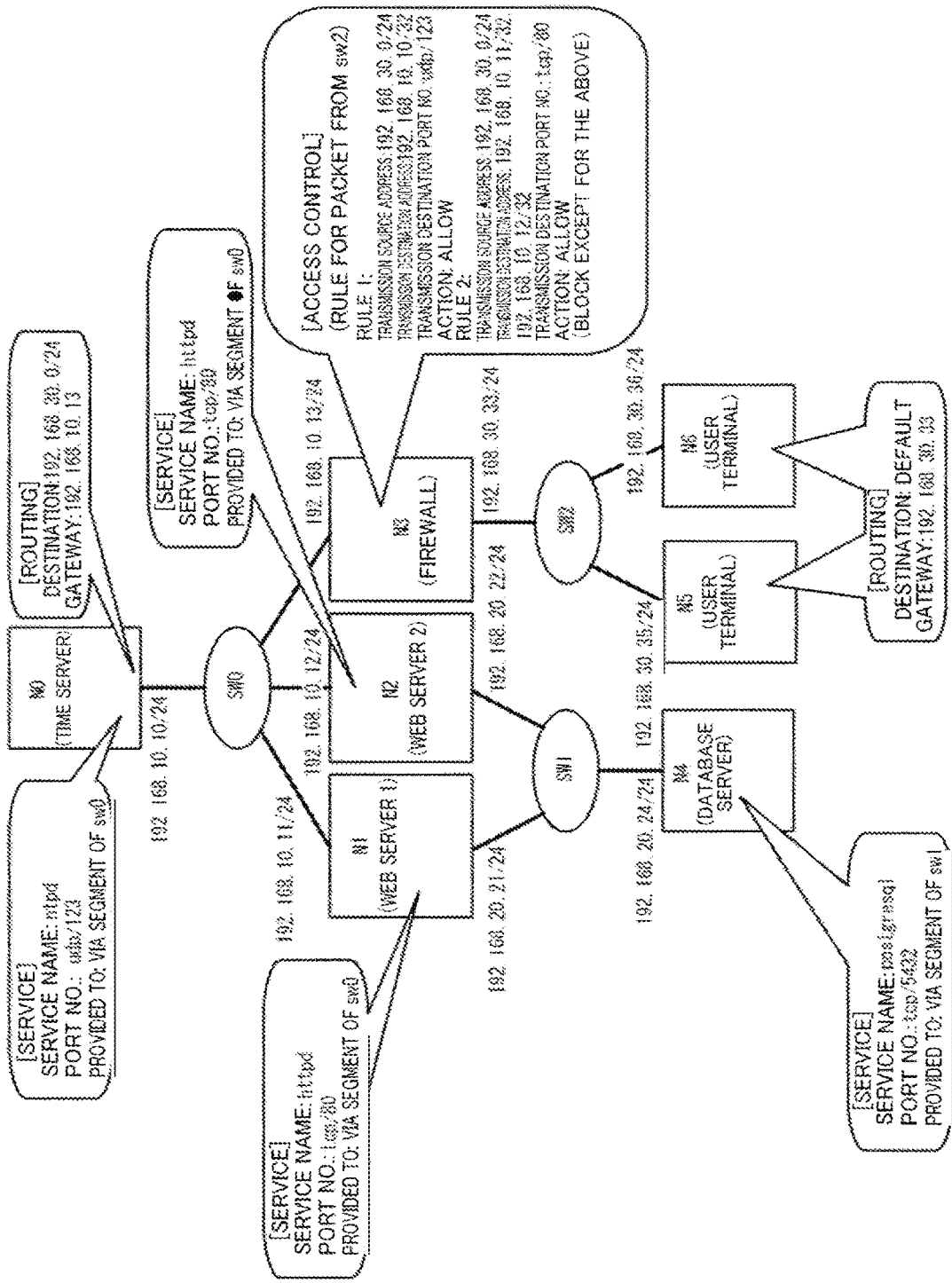
FIG. 6 is a diagram schematically showing an example of a network to be established.

The following describes the constitutional elements. In the following description, schematic illustration of a network to be established that is shown in FIG. 6 will be used as an example. That is, data formats of the constitutional elements will be described assuming establishment of a network including six nodes that are constituted by N0 (time server), N1 (Web server), N2 (Web server), N3 (firewall), N4 (database server), N5 (user terminal), and N6 (user terminal), and are connected by three switches SW0 to SW2. Note that FIG. 6 is an example, and any network can be efficiently described using the file formats (data formats) in the present invention.

(2-1) Address Table

The "address table" is a table that collectively shows address information that is assigned to NW interfaces of nodes that constitute a pseudo NW (network established in the virtual machine environment). Note that it is assumed that the nodes in the network are connected to each other via the "virtual switches" as described above.

Table 4 shows an example data structure of the address table. In the address table, a set of the following three items is written for each node, as address information that is used for connection between the node and a virtual switch.

<address family (e.g., IPv4 or IPv6), IP address, net mask>

The example shown in Table 4 shows that the node N1 is connected to the virtual switches SW0 and SW1, and address information regarding a NW interface of the node N1 that is connected to the virtual switch SW0 is <address family: IPv4, IP address: 192.168.10.11, net mask: 255.255.255.0>.

TABLE 4

|  |  | Node ID | | | | | | |
|---|---|---|---|---|---|---|---|---|
|  |  | N0 | N1 | N2 | N3 | N4 | N5 | N6 |
| Virtual switch ID | SW0 | <IPv4, 192.168.10.10, 255.255.255.0> | <IPv4, 192.168.10.11, 255.255.255.0> | <IPv4, 192.168.10.12, 255.255.255.0> | <IPv4, 192.168.10.13, 255.255.255.0> | — | — | — |
|  | SW1 | — | <IPv4, 192.168.20.21, 255.255.255.0> | <IPv4, 192.168.20.22, 255.255.255.0> | — | <IPv4, 192.168.20.24, 255.255.255.0> | — | — |
|  | SW2 | — | — | — | <IPv4, 192.168.30.33, 255.255.255.0> | — | <IPv4, 192.168.30.35, 255.255.255.0> | <IPv4, 192.168.10.36, 255.255.255.0> |

(2-2) Routing Table

The "routing table" is a table that collectively shows information regarding routing (default gateway, static routing, etc.) of the nodes constituting the pseudo NW.

Table 5 shows an example data structure of the routing table. In the routing table, a set of the following three items is written for each node, as information regarding routing relating to connection between the node and a virtual switch.

<connection destination IP address, connection destination net mask, gateway>

(Here, the IP address of a gateway via which transmission to the connection destination is to be performed is written as the item "gateway".)

The example shown in Table 5 shows that routing information regarding a NW interface of the node N0 that is connected to the virtual switch SW0 is <connection destination IP address: 192.168.30.0, connection destination net mask: 255.255.255.0, gateway: 192.168.10.13>. In the case of NW interfaces of the nodes N5 and N6 that are connected to the virtual switch SW1, a default gateway is set, the connection destination IP address and the connection destination net mask are omitted, and the default gateway is 192.168.30.33.

TABLE 5

| | | Node ID | | | | | | |
|---|---|---|---|---|---|---|---|---|
| | | N0 | N1 | N2 | N3 | N4 | N5 | N6 |
| Virtual switch ID | SW0 | <192.168.30.0, 255.255.255.0, 192.168.10.13> | — | — | — | — | — | — |
| | SW1 | — | — | — | — | — | — | — |
| | SW2 | — | — | — | — | — | <*, *, 192.168.30.33> | <*, *, 192.168.30.33> |

(2-3) Service Table

The "service table" is a table that collectively shows information regarding service functions that are provided by the nodes constituting the pseudo NW. Examples of service functions include HTTP (HyperText Transfer Protocol) and FTP (File Transfer Protocol).

Table 6 shows an example data structure of the service table. In the service table, a set of the following three items is written for each node, as information regarding a service function that is provided to another node using connection between the node and a virtual switch.

<service name, list of port numbers to be used, service setting information (setting information required according to each service function)>

The example shown in Table 6 shows that information regarding a service function that is provided by the node N1 via connection with the virtual switch SW0 is <service name: httpd, list of port numbers to be used: tcp/80>.

TABLE 6

| | | Node ID | | | | | | |
|---|---|---|---|---|---|---|---|---|
| | | N0 | N1 | N2 | N3 | N4 | N5 | N6 |
| Virtual switch ID | SW0 | <ntpd, udp/64, ntpd setting information> | <httpd, tcp/80, httpd setting information> | <httpd, tcp/80, httpd setting information> | — | — | — | — |
| | SW1 | — | — | — | — | <postgresql, tcp/5432, postgresql setting information> | — | — |
| | SW2 | — | — | — | — | — | — | — |

(2-4) Access Control Table

The "access control table" is a table that collectively shows information regarding access control that is performed at the nodes constituting the pseudo NW, the information being used in a case where the nodes are routers or firewalls.

Table 7 shows an example data structure of the access control table. In the access control table, a set of the following seven items is written for each node, as a rule for allowing (or blocking) passage of packets from a virtual switch connected to the node.

<address family, transmission source address, transmission source net mask, transmission destination address, transmission destination net mask, transmission destination port number, action (allow/block)>

In the example shown in Table 7, rules that are written in each cell are evaluated from top to bottom. In the case of rules of the node N3 with respect to SW2, the last rule <*,*,*,*,*,*, block> is a rule for rejecting all packets. Accordingly, all packets other than those to which the rule in the first line applies are blocked.

TABLE 7

| | | Node ID | | | | | | | |
|---|---|---|---|---|---|---|---|---|---|
| | | N0 | N1 | N2 | N3 | | N4 | N5 | N6 |
| Virtual switch ID | SW0 | — | — | — | — | | — | — | — |
| | SW1 | — | — | — | — | | — | — | — |
| | SW2 | — | — | — | <IPv4, 192.168.30.0, 255.255.255.0, 192.168.10.10, 255.255.255.255, udp/123, allow> <IPv4, 192.168.30.0, 255.255.255.0, 192.168.10.11, 255.255.255.255, tcp/80, allow> <IPv4, 192.168.30.0, 255.255.255.0, 192.168.10.12, 255.255.255.255, tcp/80, allow> <*, *, *, *, *, *, block> | | — | — | — |

(2-5) Meta Information Table

The "meta information table" is a table that collectively shows additional information regarding the nodes constituting the pseudo NW. Additional information regarding a node may be, for example, the use of the node, a role name or a user name of a manager, specifications regarding resources such as a memory size and an HDD size, and the like.

Table 8 shows an example data structure of the meta information table. In the meta information table, required meta information is written for each node. Items of meta information are prepared according to characteristics of the NW to be established and the necessity in operation of the NW. In the example shown in Table 8, information regarding the use and a manager of each node is shown. It is possible to set an operating terminal, a user terminal, a mail server, a DNS server, or the like as information regarding the use of a node.

TABLE 8

| | | Node ID | | | | | | |
|---|---|---|---|---|---|---|---|---|
| | | N0 | N1 | N2 | N3 | N4 | N5 | N6 |
| Meta information group | Use | Time server | Web server | Web server | Firewall | Database server | User terminal | User terminal |
| | Manager | NW manager | Server manager | Server manager | NW manager | Data manager | Terminal user | Terminal user |
| | ... | | | | | | | |

As described above, a network design, interface addresses, routing information, and the like can be unitarily managed using the tables showing a correspondence between virtual switches (SWs) and virtual machines (VMs) for reflecting the network design.

A correspondence between nodes and virtual machines (VMs) in the present invention will be described. In the present embodiment, node IDs are used to indicate the correspondence between the nodes and the VMs. Accordingly, there is a precondition that node IDs that are used to identify VMs in the VM list correspond to node IDs that are used in NW design information created by the NW designer. Also, in a case where networks are to be established indifferent virtual machine environments, it is necessary to match node IDs in respective VM lists. Note that in a case where the present invention is applied to different virtual machine environments, it is also possible to carry out conversion using a correspondence table according to node IDs for respective environments.

A procedure for automatically creating a command using the virtual machine environment information and the network design information will be described. FIGS. 7 to 9 are diagrams showing a procedure (steps 1 to 3) for creating a command for performing network setting, and an address setting command for the virtual machine (VM) of the node ID:N0 will be described as an example.

As shown in FIG. 7, an OS type and a version of the node ID:N0 are acquired referring to the VM list in the virtual machine environment information. In the example shown in FIG. 7, the OS of the node N0 is version 6 of CentOS.

Next, as shown in FIG. 8, address information that is to be set in the node N0 to connect the node N0 to the virtual switch SW0 is acquired. Specifically, a NW interface that is enabled to connect the node N0 to the virtual switch SW0 is acquired referring to the NW interface correspondence table in the virtual machine environment information. Also, address information (address family, IP address, net mask) that is used to connect the node N0 to the virtual switch SW0 is acquired from the address table in the NW design information. In the example shown in FIG. 8, address information that is to be set is: NW interface=eth0, IPv4 address=192.168.10.10, net mask=.

Then, as shown in FIG. 9, the command template table in the virtual machine environment information is referred to. Since version 6 of CentOS has already been acquired as the OS of the node N0, a command template "ifconfig<NW interface><IPv4 address><IPv4 netmask>" for which the OS identification and version (CentOS 6) match is acquired as an IPv4 address setting command. The address setting command for the node N0 can be automatically created as shown below by substituting setting values that have been acquired as described above with reference to FIG. 8 into the template.

ifconfig eth0 192.168.10.10 255.255.255.0

As described above, automatic creation of a command (automatic creation by a computer) is realized by making it possible to create a command by associating items of corresponding cells in respective management tables with each other, and filling a template with parameters acquired from the management tables. Other commands can also be created in a similar manner.

Figure 10:
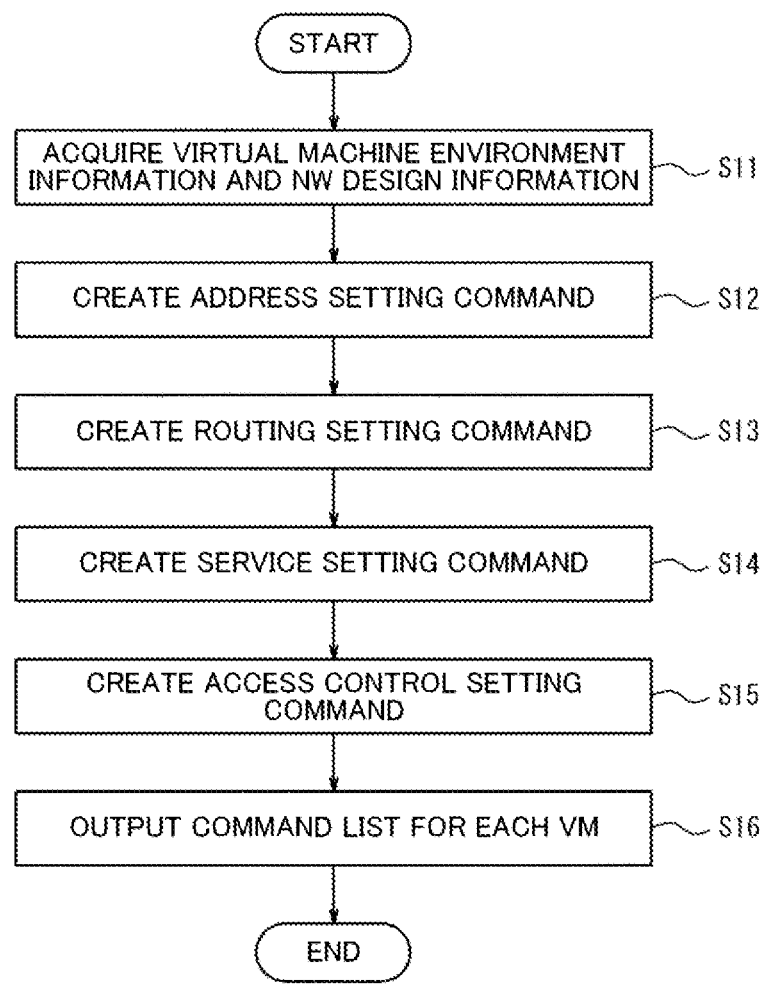
FIG. 10 is a flowchart showing operations of a command creation function.

The automatic creation of a command described above is performed using the command creation function of the network establishing terminal 1. Operations of the command creation function will be described using the flowchart shown in FIG. 10.

Step 1 (S11): Acquisition of Virtual Machine Environment Information and Network Design Information The network establishing terminal 1 acquires the "virtual machine environment information" and the "network design information".

Step 2 (S12): Creation of Address Setting Command

The network establishing terminal 1 determines, with respect to each virtual machine, information regarding an IP address that is to be assigned to a NW interface of the virtual machine based on the "NW interface correspondence table" in the virtual machine environment information and the "address table" in the network design information. Next, the network establishing terminal 1 selects a command template that is used for address setting of the virtual machine from the "command template table" in the network design information based on the "VM list". The network establishing terminal 1 creates an address setting command for the virtual machine (VM) by applying the NW interface of the node and the information regarding the to-be-assigned IP address that have been determined, to the selected command template.

Step 3 (S13): Creation of Routing Setting Command

The network establishing terminal 1 determines, with respect to each virtual machine, content of a routing setting that is to be set for a NW interface of the virtual machine based on the "NW interface correspondence table" in the virtual machine environment information and the "routing table" in the network design information. Next, the network establishing terminal 1 selects a command template that is used for routing setting of the virtual machine from the "command template table" in the network design information based on the "VM list". The network establishing terminal 1 creates a routing setting command for the virtual machine (VM) by applying the NW interface of the node and the content of the to-be-set routing setting that have been determined, to the selected command template.

Step 4 (S14): Creation of Service Setting Command

The network establishing terminal 1 determines, with respect to each virtual machine, content of a service function setting that is to be set for a NW interface of the virtual machine based on the "NW interface correspondence table" in the virtual machine environment information and the "service table" in the network design information. Next, the network establishing terminal 1 selects a command template that is used for service setting of the virtual machine from the "command template table" in the network design information based on the "VM list". The network establishing terminal 1 creates a service setting command for the virtual machine (VM) by applying the content of the service function setting to be set for the NW interface of the node that has been determined, to the selected command template.

Step 5 (S15): Creation of Access Control Setting Command

The network establishing terminal 1 determines, with respect to each virtual machine, content of an access control setting that is to be set for a NW interface of the virtual machine based on the "NW interface correspondence table" in the virtual machine environment information and the "access control table" in the network design information. Next, the network establishing terminal 1 selects a command template that is used for access control setting of the virtual machine from the "command template table" in the network design information based on the "VM list". The network establishing terminal 1 creates an access control setting command for the virtual machine (VM) by applying the content of the access control setting to be set for the NW interface of the node that has been determined, to the selected command template.

Step 6 (S16): Output of Command List for Each Virtual Machine (VM)

The network establishing terminal 1 creates a list of a group of commands obtained in steps 2 to 5 for each virtual machine (VM), and outputs the list as a command list for each virtual machine (VM).

As described above, commands (command list for each virtual machine) that are used to establish a network can be automatically created by the network establishing terminal 1. Furthermore, the network can be automatically established in a virtual machine environment as a result of the commands being automatically transmitted from the network establishing terminal 1 to the virtual machine environment 2 and automatically executed by virtual machines in the virtual machine environment.

Although the configuration and the operations of the system including the network establishing terminal 1 and the virtual machine environment 2 have been described in the embodiment described above, the present invention is not limited to the embodiment, and may also be configured as a method for establishing a network in a virtual machine environment. That is, the present invention may also be configured as a method for establishing a network in a virtual machine environment by automatically creating at least one command that is used to establish the network in the virtual machine environment, based on network design information and information regarding the virtual machine environment, and executing the at least one command, based on the message sequence chart shown in FIG. 2 or the steps in the flowchart shown in FIG. 10.

Note that a computer can be suitably used so as to function as the network establishing terminal 1 described above, and such a computer can be realized by storing a program in a storage unit of the computer and causing a CPU of the computer to read and execute the program in which content of processing for realizing the command creation function (the steps described using the flowchart) of the network establishing terminal 1 is written. Note that the program can be recorded in a computer-readable recording medium. The recording medium in which the program is recorded may also be a non-transitory (non-temporary) recording medium.

Although the embodiment described above is described as being a representative example, it is clear for a person skilled in the art that many changes and replacement can be carried out within the gist and the scope of the present invention. Therefore, the present invention should not be construed as being limited by the embodiment described above, and various variations and changes can be made without departing from the claims. For example, functions or the like included in blocks, steps, or the like can be rearranged so long as no logical contradiction occurs, and a plurality of constitutional blocks, steps, or the like can be combined or divided.

REFERENCE SIGNS LIST

1 Network establishing terminal
2 Virtual machine environment
3 Network

The invention claimed is:

1. A system, comprising:
a network establishing terminal that includes a command creation function; and
at least one hardware server device that provides a virtual machine environment in which a virtual machine operates, wherein
the network establishing terminal is configured to execute the command creation function to automatically create a command list including a plurality of commands to establish a network in the virtual machine environment based on network design information and virtual machine environment information,
the network design information includes, as information regarding each node that constitutes the network: information regarding an address, information regarding routing, information regarding a service, information regarding access control, and meta information regarding a virtual machine,
the virtual machine environment information includes: a list of virtual machines that are pooled in the virtual machine environment, information regarding network interfaces of the virtual machines, and templates of commands corresponding to operating systems of the virtual machines, the command list is prepared for each virtual machine that is pooled in the virtual machine environment,
the plurality of commands includes an address setting command, a routing setting command, a service setting command, and an access control setting command, and
execution of the command creation function by the network establishing terminal to create the command list includes:
acquiring the network design information and the virtual machine environment information;
creating the address setting command for each virtual machine of the virtual machine list by applying a network interface of the node and a to be determined address to a selected address setting command template;
creating a routing setting command for each virtual machine of the virtual machine list by applying the network interface of the node and content of a to-be-set routing setting to a selected routing setting command template;
creating a service setting command for each virtual machine of the virtual machine list by applying content of a service function setting to be set for the network interface of the node to a selected service setting command template;
creating the access control setting command for each virtual machine of the virtual machine list by applying content of access control setting to be set for the network interface of the node to a selected access control setting command template;
creating the command list; and
outputting the command list to each virtual machine in the virtual machine list.

2. The system according to claim 1, wherein the creating the command list includes:
reading at least an OS of a virtual machine that is pooled in the virtual machine environment and a template of a command corresponding to the OS of the virtual machine from the information regarding the virtual machine environment;
reading at least information that is to be set in a node of the network from the network design information; and
applying the information that is to be set in the node to a parameter in the template of the command.

3. The system according to claim 1, wherein
the virtual machine environment information includes a command template table including a plurality of cells associating operation, OS type, version and command templates with each other.

4. The system according to claim 3, wherein each operation in the command template table corresponds to any of address setting, routing setting, service setting and access control setting.

5. The system according to claim 4, wherein selection of a command template for each created command is performed by selecting a command template from the command templates in the command template table according to associated operation, OS type and version.

6. The system according to claim 5, wherein the network established in the virtual machine environment includes a time server, a web server, a firewall, a database server, and at least a first user terminal and a second user terminal.

7. The system according to claim 1, wherein the network established in the virtual machine environment includes a time server, a web server, a firewall, a database server, and at least a first user terminal and a second user terminal.

8. A method, comprising:
automatically creating a command list including a plurality of commands to establish a network in a virtual machine environment, based on network design information and virtual machine environment information; and
executing the plurality of commands to establish the network in the virtual machine environment, wherein
the network design information includes, as information regarding each node that constitutes the network: information regarding an address, information regarding routing, information regarding a service, information regarding access control, and meta information regarding a virtual machine,
the virtual machine environment information includes: a list of virtual machines that are pooled in the virtual machine environment, information regarding network interfaces of the virtual machines, and templates of commands corresponding to operating systems of the virtual machines,
the command list is prepared for each virtual machine that is pooled in the virtual machine environment,
the plurality of commands includes an address setting command, a routing setting command, a service setting command, and an access control setting command, and
the automatically creating the command list includes:
acquiring the network design information and the virtual machine environment information;
creating the address setting command for each virtual machine of the virtual machine list by applying a network interface of the node and a to be determined address to a selected address setting command template;

creating a routing setting command for each virtual machine of the virtual machine list by applying the network interface of the node and content of a to-be-set routing setting to a selected routing setting command template;

creating a service setting command for each virtual machine of the virtual machine list by applying content of a service function setting to be set for the network interface of the node to a selected service setting command template;

creating the access control setting command for each virtual machine of the virtual machine list by applying content of access control setting to be set for the network interface of the node to a selected access control setting command template;

creating the command list; and outputting the command list to each virtual machine in the virtual machine list.

9. The method according to claim 8, wherein the creating the command list includes:

reading at least an OS of a virtual machine that is pooled in the virtual machine environment and a template of a command corresponding to the OS of the virtual machine from the information regarding the virtual machine environment;

reading at least information that is to be set in a node of the network from the network design information; and applying the information that is to be set in the node to a parameter in the template of the command.

10. The method according to claim 8, wherein the virtual machine environment information includes a command template table including a plurality of cells associating operation, OS type, version and command templates with each other.

11. The method according to claim 10, wherein each operation in the command template table corresponds to any of address setting, routing setting, service setting and access control setting.

12. The method according to claim 11, wherein selection of a command template for each created command is performed by selecting a command template from the command templates in the command template table according to associated operation, OS type and version.

13. The method according to claim 12, wherein the network established in the virtual machine environment includes a time server, a web server, a firewall, a database server, and at least a first user terminal and a second user terminal.

14. The method according to claim 8, wherein the network established in the virtual machine environment includes a time server, a web server, a firewall, a database server, and at least a first user terminal and a second user terminal.

15. A non-transitory computer readable medium storing computer executable instructions which, when executed by a computer, cause the computer to execute a process comprising:

automatically creating a command list including a plurality of commands to establish a network in a virtual machine environment, based on network design information and virtual machine environment information; and executing the plurality of commands to establish the network in the virtual machine environment, wherein the network design information includes, as information regarding each node that constitutes the network: information regarding an address, information regarding routing, information regarding a service, information regarding access control, and meta information regarding a virtual machine, the virtual machine environment information includes: a list of virtual machines that are pooled in the virtual machine environment, information regarding network interfaces of the virtual machines, and templates of commands corresponding to operating systems of the virtual machines, the command list is prepared for each virtual machine that is pooled in the virtual machine environment, the plurality of commands includes an address setting command, a routing setting command, a service setting command, and an access control setting command, and the automatically creating the command list includes:

acquiring the network design information and the virtual machine environment information;

creating the address setting command for each virtual machine of the virtual machine list by applying a network interface of the node and a to be determined address to a selected address setting command template;

creating a routing setting command for each virtual machine of the virtual machine list by applying the network interface of the node and content of a to-be-set routing setting to a selected routing setting command template;

creating a service setting command for each virtual machine of the virtual machine list by applying content of a service function setting to be set for the network interface of the node to a selected service setting command template;

creating the access control setting command for each virtual machine of the virtual machine list by applying content of access control setting to be set for the network interface of the node to a selected access control setting command template;

creating the command list; and outputting the command list to each virtual machine in the virtual machine list.

16. The program non-transitory computer readable medium according to claim 15, wherein the creating the command list includes:

reading at least an OS of a virtual machine that is pooled in the virtual machine environment and a template of a command corresponding to the OS of the virtual machine from the information regarding the virtual machine environment;

reading at least information that is to be set in a node of the network from the network design information; and applying the information that is to be set in the node to a parameter in the template of the command.

17. The non-transitory computer readable medium according to claim 15, wherein the virtual machine environment information includes a command template table including a plurality of cells associating operation, OS type, version and command templates with each other.

18. The non-transitory computer readable medium according to claim 17, wherein each operation in the command template table corresponds to any of address setting, routing setting, service setting and access control setting.

19. The non-transitory computer readable medium according to claim 18, wherein selection of a command template for each created command is performed by selecting a command template from the command templates in the command template table according to associated operation, OS type and version.

20. The non-transitory computer readable medium according to claim 19, wherein the network established in the virtual machine environment includes a time server, a web server, a firewall, a database server, and at least a first user terminal and a second user terminal.

\* \* \* \* \*